(12) United States Patent
Swires

(10) Patent No.: US 8,307,788 B2
(45) Date of Patent: Nov. 13, 2012

(54) CHUTE INFLATABLE

(76) Inventor: Jerry Swires, McLean, TX (US)

( * ) Notice: Subject to any disclaimer, the term of this patent is extended or adjusted under 35 U.S.C. 154(b) by 510 days.

(21) Appl. No.: 12/571,884

(22) Filed: Oct. 1, 2009

(65) Prior Publication Data
US 2010/0242858 A1    Sep. 30, 2010

Related U.S. Application Data

(60) Provisional application No. 61/102,951, filed on Oct. 6, 2008.

(51) Int. Cl.
*A01K 37/00*    (2006.01)
(52) U.S. Cl. ........................................ 119/712
(58) Field of Classification Search ................ 119/712; 248/345.1; *A01K 29/00*
See application file for complete search history.

(56) References Cited

U.S. PATENT DOCUMENTS

| | | | | |
|---|---|---|---|---|
| 3,051,984 A * | 9/1962 | Hlavacek et al. | | 452/54 |
| 3,199,689 A * | 8/1965 | Feldkamp | | 410/119 |
| 3,319,608 A * | 5/1967 | Klooster | | 119/723 |
| 3,590,784 A * | 7/1971 | Fly | | 119/722 |
| 4,000,585 A * | 1/1977 | Denaro | | 52/2.17 |
| 4,055,148 A * | 10/1977 | Brockman et al. | | 119/723 |
| 4,061,310 A | 12/1977 | Vetter | | |
| 4,070,989 A * | 1/1978 | Ganzel | | 119/516 |
| 4,193,151 A * | 3/1980 | Calleance | | 5/681 |
| 4,491,089 A * | 1/1985 | Kelly et al. | | 119/722 |
| 5,054,854 A * | 10/1991 | Pruit | | 297/284.3 |
| 5,392,477 A | 2/1995 | Wolter | | |
| 5,628,275 A * | 5/1997 | Casey | | 119/28.5 |
| 5,839,132 A * | 11/1998 | Rooney | | 4/583 |
| 5,926,873 A * | 7/1999 | Fountain | | 5/424 |
| 6,009,873 A | 1/2000 | Neviaser | | |
| 6,453,485 B2 * | 9/2002 | Bullock | | 4/580 |
| 7,412,738 B2 * | 8/2008 | Chaffee | | 5/706 |
| 7,437,779 B2 * | 10/2008 | Kenny et al. | | 4/580 |
| 7,712,998 B2 * | 5/2010 | Salemie | | 405/111 |
| 2002/0125758 A1* | 9/2002 | Duncan | | 297/452.41 |
| 2003/0143904 A1* | 7/2003 | Morrow et al. | | 441/12 |
| 2005/0235418 A1* | 10/2005 | Jacques et al. | | 5/424 |
| 2009/0049617 A1* | 2/2009 | Chaffee | | 5/706 |
| 2009/0081404 A1 | 3/2009 | Liles | | |
| 2010/0159796 A1* | 6/2010 | Chiang | | 446/220 |

* cited by examiner

*Primary Examiner* — Richard Price, Jr.
(74) *Attorney, Agent, or Firm* — Law Firm Susanne M. Moore, PLLC; Susanne M. Moore

(57) ABSTRACT

An inflatable device for shifting an animal's position in a chute, and specifically a bull in a bull riding event. The wedge includes an inflatable bladder with an opening to receive the inflatant from an inflatant source and one or more communicating passages transporting the inflatant to and from the inflatable bladder wherein inflation and deflation of the inflatable bladder controls the position of the animal in a chute.

12 Claims, 7 Drawing Sheets

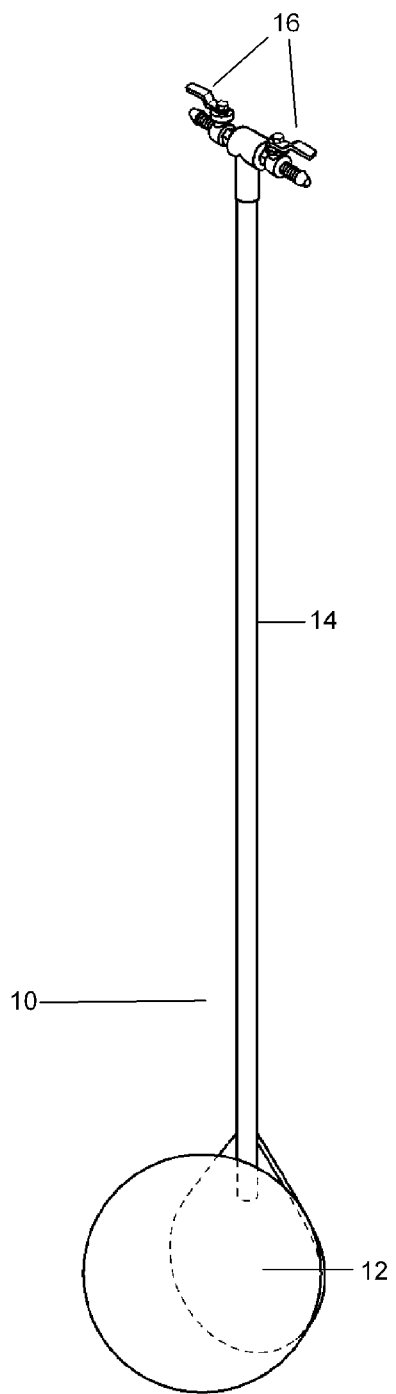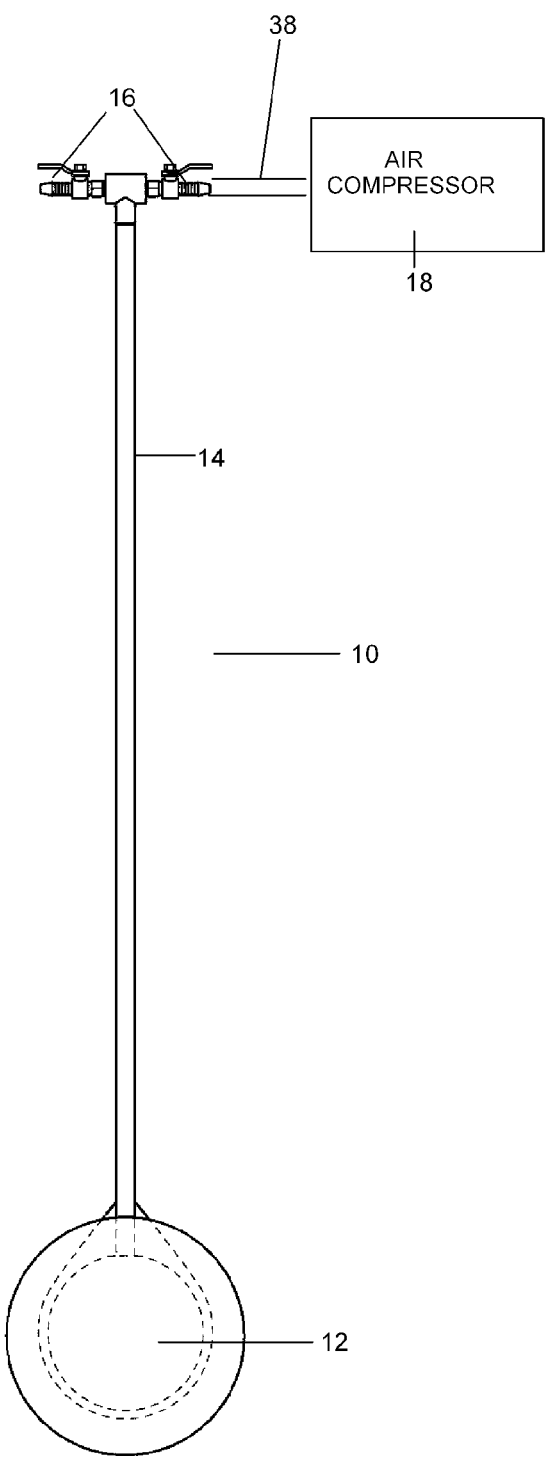
FIG. 1
FIG. 2

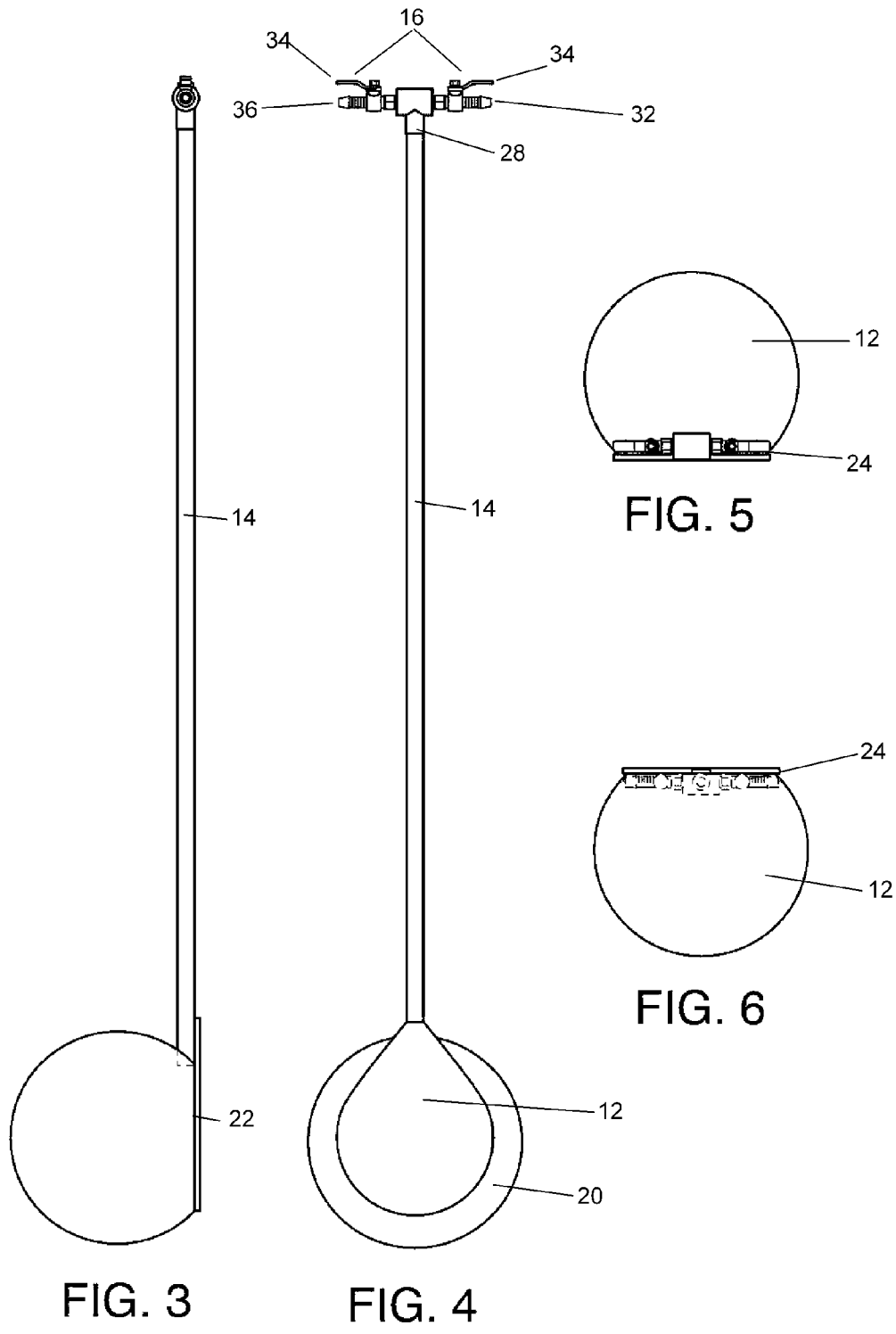

CHUTE INFLATABLE

CROSS REFERENCE TO RELATED APPLICATIONS

This application claims the benefit of provisional patent application 61/102,951 filed Oct. 6, 2008 by the present inventor and the application is hereto incorporated by reference in its entirety.

STATEMENT REGARDING FEDERALLY SPONSORED RESEARCH OR DEVELOPMENT

Not Applicable

NAMES OF PARTIES TO JOINT RESEARCH AGREEMENT

Not Applicable

REFERENCE TO SEQUENCE LISTING

Not Applicable

DESCRIPTION OF ATTACHED APPENDIX

Not Applicable

BACKGROUND OF THE INVENTION

1. Field of the Invention

This invention relates generally to safety equipment useful in rough stock riding and more particularly, safety and positioning equipment useful for shifting an animal's position when in a rodeo chute.

2. Description of Related Art

Rough stock riding, and particularly bull riding, is considered one of the world's most dangerous sports and is known to be as dangerous inside the chute as outside the chute. A bull chute is a narrow rectangular pen, typically made of metal rails or poles. The pen has a narrow front end, a narrow rear end, a long inner side wall that is fixed(bull's left) and, opposite that, a long outer side chute gate that opens (bull's right). The bull enters via the narrow rear end of the chute and faces the narrow front end. Upon cue from the rider, the long outer side gate of the chute opens and the bull rages out.

As the bull is standing in the chute, a number of undesirable things often happen. The bull, knowing that the long outer side gate will soon open, often turns his head toward the gate in anticipation. As he does so his body, and specifically his shoulder area, naturally leans into the back wall of the chute. This is undesirable as the rider cannot insert his left leg between the bull and the chute wall so that he may mount the bull. Even worse the bull rider's leg often becomes pinned between the bull's left side and the rear wall. Significant injuries can result including twisted knees, broken bones and crushing pain.

In an effort to remedy this problem, rodeo staff and cowboys outside of the chute traditionally insert a 2×4 or 4×4 over the top of the wall and push it down between the bull and the wall in an effort to pry the bull's weight off the side of the chute. They may also climb up on the chute wall and put their feet between the rail and the top of the bull, pushing the bull off the wall if possible. These measures are time consuming, difficult and potentially dangerous.

There is a need for a fast yet effective way to shift the weight and position of a large animal, and one specifically designed to shift the position of a bull in a chute.

SUMMARY OF THE INVENTION

In accordance with the present invention, an improved method and apparatus is disclosed for quickly and easily shifting the weight and position of a large animal in a chute. The disclosed invention poses several advantages in that it does not harm the animal, is quick and easy to use and is safe since it enables humans to keep some distance from the animal as they are using it.

More particularly, the present invention includes an inflatable device having an inflatable bladder that does not injure an animal when used in its inflated form as a wedge between the animal and a wall or rail. The inflatable device is inflated and deflated by connection to an inflatant source by a communicating passage, which may be a hose, and having at least one air valve to control the inflation and deflation of the bladder. Inflation of the bladder acts as a wedge, shifting the animal from its contact with the chute wall.

The inflatable device may be a portable wedge with a handle connected to the inflatable bladder, its outer covering or a flat stabilizing plate on the back of the wedge so that a user can push the deflated wedge down between the animal and the chute wall. The handle may be hollow and serve to transport the inflatant from the inflatant source to the inflatable bladder. The inflatant source may be connected to an air valve at the top of the handle via a communicating passage which may be a hose or pipe, in which case the handle transports the inflatant from the air valve to the inflatable bladder. The source of inflatant may be an air compressor, or any other suitable means of delivering a pressurized air.

The inflatable bladder, whether in the portable or built-in embodiment may be covered by an outer covering to further avoid injury or startling to the animal.

The present invention further includes using one or more built-in inflatable wedges on a chute wall that have one or more openings for receiving and discharging an inflatant, with hose or piping to deliver the inflatant and an air valve for controlling the delivery. A control box may be used to further control the delivery of the inflatant and may have a hose running from the inflatant source, which may be an air compressor, to the control box and then additional hose, piping or tubing running from the control box to each inflatable wedge. The control box may have one or more air valves to control inflation and deflation. The control box may have features allowing a user to control the speed and other features of the inflation and deflation.

Other advantages of the present invention will become apparent from the following descriptions, taken in connection with the accompanying figures, wherein, by way of illustration and example, an embodiment of the present invention is disclosed.

BRIEF DESCRIPTION OF THE DRAWINGS

The figures constitute a part of this specification and include exemplary embodiments to the invention, which may be embodied in various forms. It is to be understood that in some instances various aspects of the invention may be shown exaggerated or enlarged to facilitate an understanding of the invention. To enable more thorough understanding of the features and advantages of the present invention, reference is now made to the detailed description of the invention along with the accompanying figures in which:

FIG. 1 is a perspective view of a preferred embodiment of the portable invention.

FIG. 2 is a front outer view of a preferred embodiment of the portable invention.

FIG. 3 is a side view of a preferred embodiment of the portable invention.

FIG. 4 is a front inner view of a preferred embodiment of the portable invention.

FIG. 5 is a close up view of the inflatable bladder closure in a preferred embodiment of the portable invention.

FIG. 6 is a close up view of the inflatable bladder in a preferred embodiment of the portable invention.

FIG. 7 is an inside view of the chute fixed wall, reflecting a preferred embodiment of the invention as built-in.

FIG. 8 is an exterior view of the chute fixed wall, reflecting a preferred embodiment of the invention as built-in.

FIG. 9 is a view of the chute fixed wall, reflecting a preferred embodiment of the piping of the built-in embodiment of the invention.

FIG. 10 is a side view of the chute fixed wall, reflecting a preferred embodiment of the invention as built-in.

FIG. 11 is a front perspective view of a preferred embodiment of the invention as built-in.

DETAILED DESCRIPTION OF THE PREFERRED EMBODIMENTS

Figure 7:
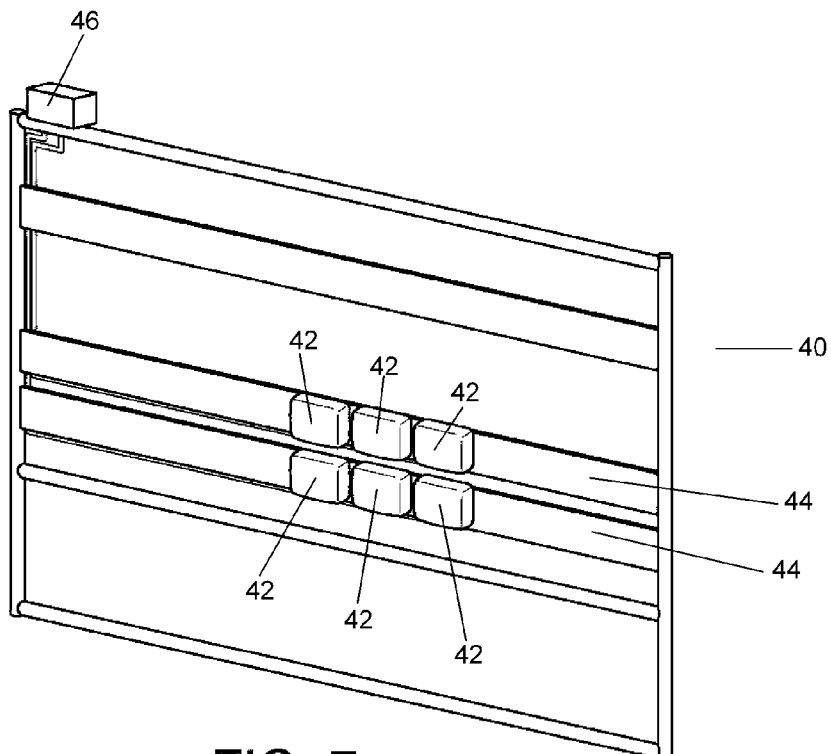

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The term "bag" refers to any container for holding air and may include a bladder, bag, ball, balloon or pouch or any other durable bladder or container that holds, temporarily or permanently a pressurized gas such as air.

The term "inflatant" refers to ambient air, pressurized air, compressed air, carbon dioxide, oxygen, nitrogen, hydrogen, water or other similar suitable substance that can quickly inflate a bladder, bag, ball, balloon or pouch.

The term "inflatable" refers to any type of container that expands with the delivery into it of an inflatant and contracts with the release of such inflatant.

The phrase "inflatable wedge" refers to an inflatable and deflatable apparatus of any shape that, in its deflated state, is positioned between two objects and is subsequently inflated to drive the two objects apart.

The phrase "inflatant source" refers to an air compressor, a cylinder or tank of inflatant or other reasonable means of capturing and delivering an inflatant.

The phrase "point of contact" refers to an area where two objects are or become pressed together.

The phrase "communicating passage" refers to hose, piping, tubing or other hollow means.

The disclosed invention is distinguished from the currently employed methods described above by several important factors which allow for much quicker, easier, safer and gentler intervention when a rider's leg is being pinned against one or more chute rails by the bull, or when a bull is leaning heavily against the chute wall such that the rider cannot mount the animal.

First, the inflatable wedge of the disclosed invention, in its deflated flat mode, is thin, in the preferred embodiment less than one inch wide, which makes it easy to wedge between the animal's body and the rail, unlike a 4×4 or a human foot or leg.

Second, in both the portable and the built-in embodiments, the inflatable wedge shifts the animal's position without the need for close up human intervention. Even in the portable embodiment, the long handle enables the user to maintain a safe distance from the animal. This technique is far safer than the current common technique of inserting one's feet or legs into the chute area to push the animal off the wall.

Third, the disclosed invention is much gentler to the animal as it lacks the sharp corners and hardness of the commonly used 4×4, or even of a cowboy boot. In another embodiment, the outer covering of the wedge may be animal hide, although it may also be fabric, nylon, hide, leather or other reasonably soft and durable material. The wedge thus has the qualities of a pillow or cushion.

Four, the disclosed invention achieves the goal of shifting the animal's position much faster than the currently used art. In the portable embodiment, when the bladder is in its thin deflated state, and with the handle, it is quick and easy to wedge into position, even if the animal is tightly pressed against the wall. Once wedged into position, the wedge is quickly inflated. Using an air compressor, on a soccer ball sized and shaped wedge, takes just a few seconds. The portable embodiment is advantageous over the built-in embodiment in that it can be used in any chute, anywhere.

The built-in embodiment of the disclosed invention offers the same significant advantages over the currently employed methods as those described above. The built-in embodiment has the additional advantages of eliminating any need for a user to enter the chute, and further eliminates the portable embodiment's need for positioning the wedges, thus improving safety and speed. In this embodiment, one or more inflatable wedges are mounted (temporarily or permanently) to rails of the chute, on the fixed long wall, in a position where the front side of the animal's body (shoulder region) would cause interference with the rider's leg. A control box is mounted to the chute wall. Pipeline travels from the control box to each wedge and transports the inflatant to each individual wedge. The inflatant source, which may be an air compressor, or any suitable cylinder of inflatant substance is connected to the control box via a hose or other reasonable means of transport. Upon the animal leaning against the chute wall, pinning the rider's leg or preventing the rider from mounting the animal, the desired one or more wedge[s] may be inflated from the control box, gently shifting the animal's position.

In the built-in embodiment, when multiple small wedges are used rather than one large one, the inflation process is quicker, especially if not all the small wedges require inflating to move the animal. In an embodiment, the control box enables a user to select which wedges to inflate.

With either the built-in embodiment or the portable embodiment, the wedge[s] may use an outer covering that is durable yet will not alarm or agitate the animal. For example, a cow hide outer covering is effective as it is soft against the animal, looks familiar and does not make undue rustling noise.

As illustrated in FIGS. 1-3, in one embodiment, the disclosed invention is portable. A portable wedge 10 comprises an inflatable bladder 12, a hollow handle 14, an air valve assembly 16 and an inflatant source 18.

As FIG. 4 depicts, the inflatable bladder 12 may further be encased by an outer covering 20. To improve stability, durability and improve the ease with which the wedge is positioned into place, a flat support plate 22 as shown in FIG. 3 may be mounted to the rear of the bladder 12 or, if an outer cover 20 is used, to the outer cover 20 and to the rear of the hollow handle 14. In the prototype a steel plate was used but other materials could be used including wood, metal, plastic, rubber or other suitably durable materials.

The inflatable bladder 12 may be manufactured from any suitable durable material that may include, but is not limited to rubber, plastic or vinyl materials, sufficient to hold compressed or pressurized air even against the weight of a large animal. The bladder 12 must be of sufficient size to, upon inflation, move the position or weight of a large animal. The prototype was of soccer ball size and was quite effectual for the desired purpose.

The outer covering 20 may be manufactured from any suitable durable material that will not startle, harm or be abrasive to the animal. Potentially suitable materials may include, but are not limited to, animal hide, plastic, leather, nylon, fabric or other suitable materials.

Turning to FIGS. 5-6, the top of the inflatable bladder 12 is open, similar to that of a balloon, and is encircled by a hose clamp 24, or other suitable means of closure, that may be tightened or loosened to decrease the circumference of the opening. In a preferred embodiment, the distal end 26 of the hollow handle 14 is inserted into the inflatable bladder 12 and the hose clamp 24 is tightened around the handle 14, preventing the escaping of inflatant.

At the proximal end 28 of the hollow handle 14 is an air valve assembly 16 that, in an embodiment, may comprise an inlet valve 32 with a handle 34 and an outlet valve 36 with a handle 34. In the prototype, an air compressor was used as the inflatant source 18 and was connected via its hose 38 to the inlet valve 32. The inlet valve handle 34 and the air compressor are turned on and inflatant travels into the inlet valve 32, down the hollow handle 34 and into the inflatable bladder 12, inflating the bladder 12. Similarly, to deflate the bladder 12, the inlet valve 32 is turned off and the outlet valve 36 is turned on, allowing inflatant to escape out. Other forms of inflatant and inflatant source 18 may be used, as described in the definitions section of this application. Similarly, a dual valve could be used in place of two separate valves for inflation and deflation.

Figure 8:
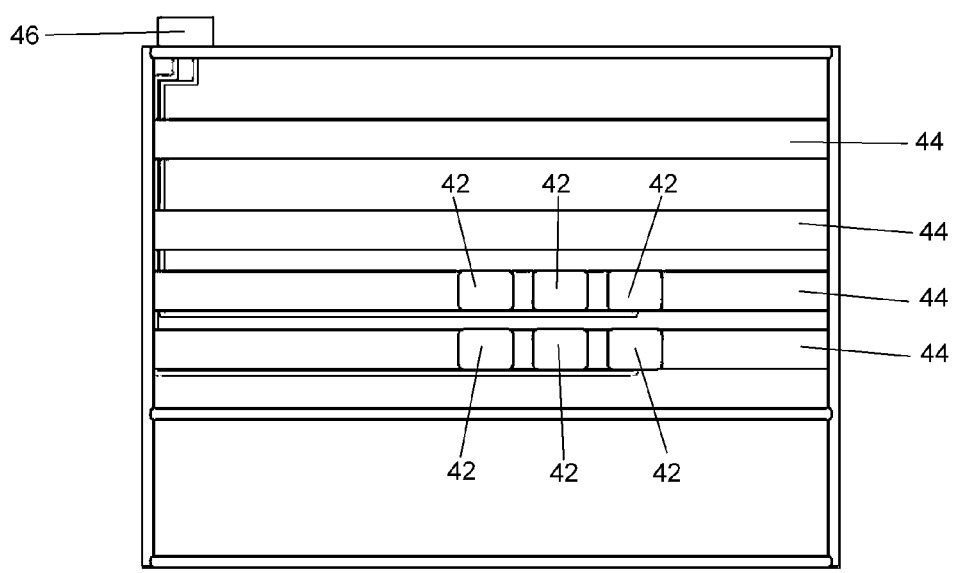

Turning to FIG. 7, an interior view of the chute wall 40 and the mounted wedges 42, and FIG. 8, an exterior view of the chute wall 40 and the mounted wedges 42, an additional embodiment of the invention as a built-in component to the chute wall 40 is disclosed. In this embodiment, one or more inflatable wedges 42 are mounted to the chute wall 40 at a location congruent to where a bull's shoulder would be. One wedge 42 could be used, although it would need to be large enough to cover the approximate area where a bull's shoulder would reach a point of contact with the wall 40. This expanse could vary depending on the size of the animal. Using a wedge 42 this large would increase the time needed for inflation. In the prototype, six wedges 42 were used, evenly spaced in a pattern of three placed along one of the chute rails 44, parallel to and above three more placed along a lower chute rail 44. Varying numbers of wedges 42 may be used; however six was noted to be a preferred embodiment as the result covered a large expanse of area. The user could then choose to inflate specific wedges 42, rather than all the wedges 42, as determined by the animal's placement against the wall 40.

As further illustrated in FIGS. 7-12B, a control box 46 is mounted to the chute wall 40. As depicted more clearly in FIG. 9, pipeline 48 runs from each wedge 42 to the control box 46, allowing individual inflation and deflation of chosen wedges 42. In the prototype, 1/4" copper tubing was used for this purpose, although any small diameter tubing or piping, durable enough to withstand outdoor elements and animals, would be effective.

The control box 46 has an intake and outlet valve for receiving inflatant from an inflatant source 18 and similarly releasing the same.

Figures 9, 10:
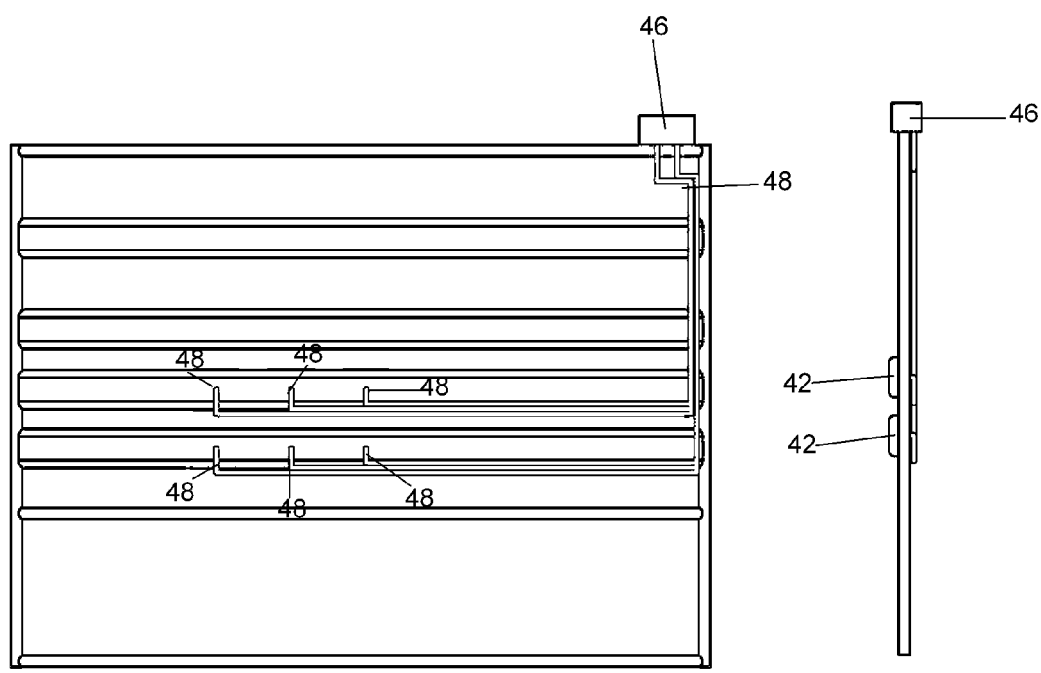

FIG. 10 depicts an aerial view of using four wedges 42 rather than six, as varying numbers may be used. The bottom two wedges 42 are not seen as they are parallel to and below the two shown wedges 42.

Figure 11:
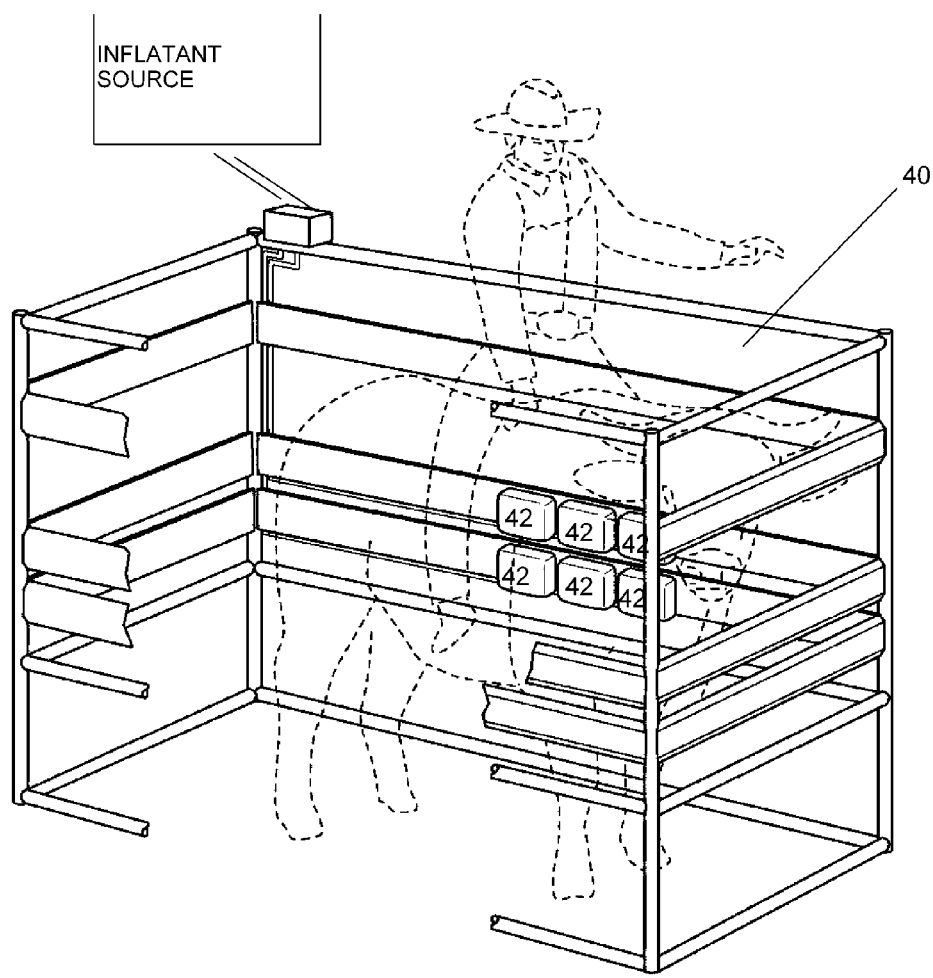

Turning to FIG. 11, a phantom bull rider is illustrated in the chute, the distal fixed chute wall 40 reflecting the mounted wedges 42 at the bull's shoulder level area.

Figure 12A:
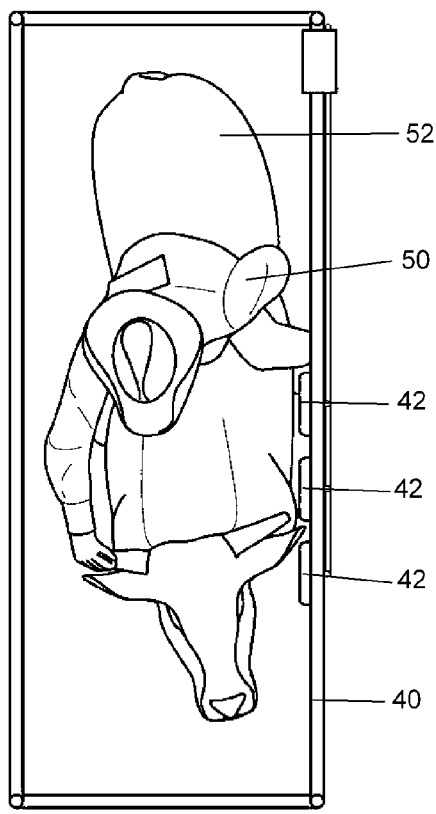
FIG. 12A is a perspective view of the animal and rider in the chute, reflecting a preferred embodiment of the invention as built-in, and with the wedges in their deflated state.
Figure 12B:
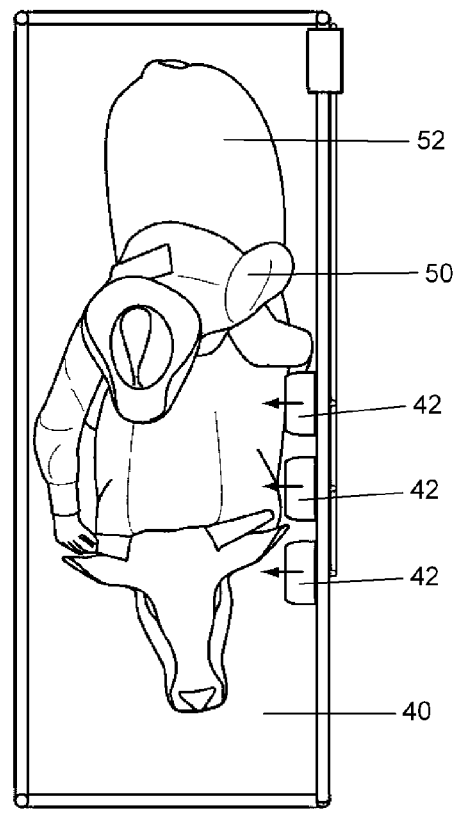
FIG. 12B is a perspective view of the animal and rider in the chute, reflecting a preferred embodiment of the invention as built-in, and with the wedges in their inflated state.

Even more illustrative of the inflation effect of the mounted wedges 42, in the built-in embodiment, is FIG. 12A, showing an aerial view of the bull rider 50 in position on the bull 52 and the mounted wedges 42 in their deflated mode. FIG. 12B offers the same aerial view however in this view the wedges 42 have been inflated and are pushing the bull 52 off the distal fixed chute wall 40, freeing the rider's leg area.

Figure 13A:
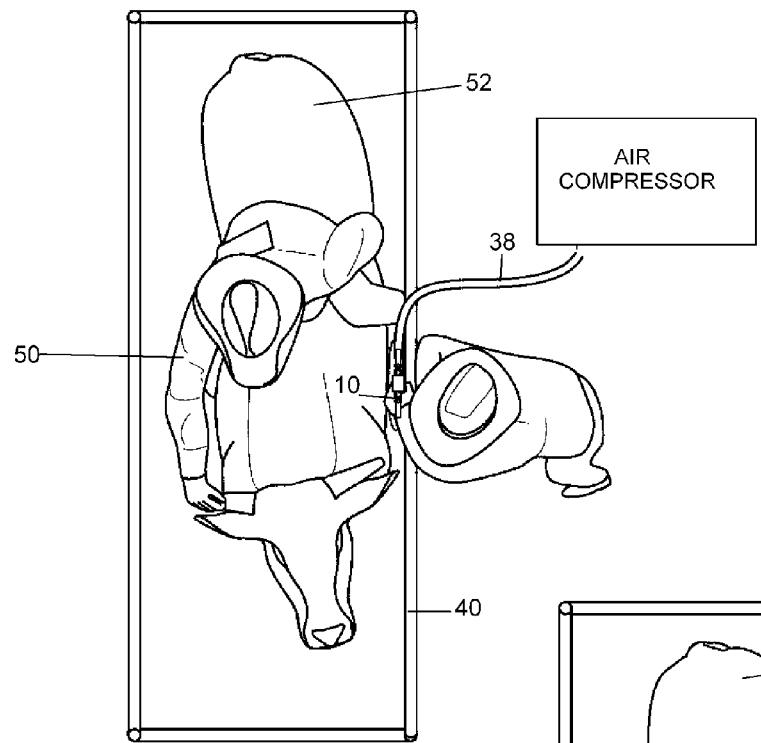
FIG. 13A is a perspective view of the animal and rider in the chute, reflecting a preferred embodiment of the portable embodiment of the invention, in its deflated state.
Figure 13B:
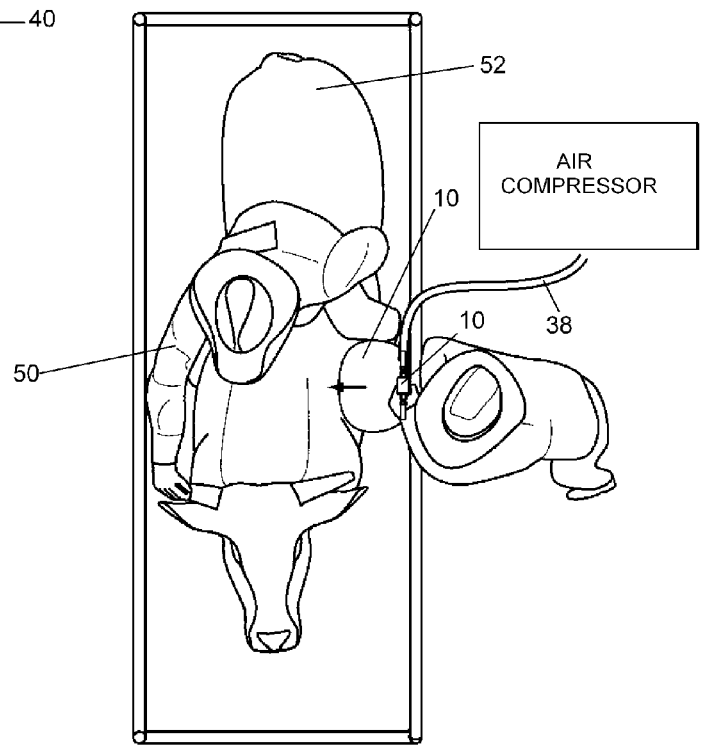
FIG. 13B is a perspective view of the animal and rider in the chute, reflecting a preferred embodiment of the portable embodiment of the invention, in its inflated state.

Returning to the portable embodiment of the disclosed invention, FIG. 13A illustrates a user inserting the portable wedge 10 between the bull 52 and the chute wall 40. Once the wedge 10 is positioned, the air compressor hose 38 is attached to the air valve assembly 16 as described in more detail in FIGS. 1-4 and the wedge 10 is inflated, pushing the bull 52 off the chute wall 40, as depicted in FIG. 13B.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It is to be understood that the embodiments disclosed herein are shown for illustrative purposes and are not intended to be construed as limitations of the disclosed method and system. Those skilled in the art will recognize or be able to ascertain in the course of routine experimentation, that variations and equivalents of the embodiments may be undertaken without departing from the scope of the invention.

Certain terms are used throughout the description to refer to particular method components. As one skilled in the art will appreciate, design and manufacturing companies may refer to a component by different names. This document does not intend to distinguish between components that differ in name but not function.

The terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other intermediate devices and connections. Moreover, the term "method" means "one or more components" combined together. Thus, a method can comprise an "entire method" or "sub methods" within the method.

The use of the word "a" or "an" when used in conjunction with the word "comprising" may mean "one", or may also mean "one or more." The use of the term "or" in the claims is used to mean "and/or" unless explicitly indicated to refer to alternatives only or the alternatives are mutually exclusive, although the disclosures supports a definition that refers to only alternatives and "and/or."

The methods and systems disclosed and claimed herein can be made and executed without undue experimentation based on the level of disclosure presented. While the methods and systems have been described in terms of their preferred embodiments, it will be apparent to those skilled in the art that they are not limited to the exact steps described and may vary from such description without departing from the scope and spirit of the invention. The substitutes and modifications employed by one skilled in the art are deemed to fall within the scope of the invention.

What is claimed is:

1. A portable inflatable device to act as a wedge for shifting an animal's position in a chute, the inflatable device comprising:
    an inflatable bladder that does not injure an animal while shifting the animal's position in a chute, the bladder further comprising an opening for receiving an inflatant;
    a hollow handle connected to the bladder, the handle being of sufficient length to enable the user to maintain a safe distance from the animal while wedging the deflated device between the animal and the chute wall, the handle further serving as a communicating passage for inflatant traveling from an air valve assembly mounted to the top of the handle to the bladder when inflating, and from the bladder back up to the air valve assembly when deflating, the air valve assembly further in communication with an inflatant source.

2. The inflatable device of claim 1 wherein a flat support plate is mounted to the rear of the wedge.

3. The inflatable device of claim 1 wherein the air valve assembly further comprises an inlet valve with a handle and an outlet valve with a handle.

4. The inflatable device of claim 1 wherein the source of inflatant comprises an air compressor.

5. The inflatable device of claim 1 wherein the bladder is encased by an outer covering that does not injure an animal.

6. The inflatable device of claim 1 wherein the hollow handle is connected to the inflatable bladder by a clamp encircling the open top of the bladder around the distal end of the handle.

7. A portable inflatable wedge for shifting an animal's position in a chute comprising:
    an inflatable bladder with an opening for receiving an inflatant;
    a source of inflatant, and
    a first and second communicating passage for transporting the inflatant into the inflatable bladder, wherein the first communication passage is a hollow pipe serving additionally as a handle for a user to hold the inflatable bladder in the chute while maintaining a safe distance from the animal, the handle having one end that couples with the inflatable bladder opening and an opposite end connected to an air valve assembly that couples to the source of inflatant and controls the amount of inflatant in the inflatable bladder including release of the inflatant, wherein the second communicating passage is a hose having one end connected to the air valve assembly and the opposite end connected to the source of inflatant.

8. The portable inflatable wedge of claim 7 wherein the bladder is encased by an outer covering that does not injure an animal.

9. The portable inflatable wedge of claim 7 wherein the inflatable bladder is further stabilized by a posterior flat support plate.

10. The portable inflatable wedge of claim 7 wherein the air valve assembly further comprises an inlet valve with a handle and an outlet valve with a handle.

11. An inflatable device for shifting an animal's position in a chute, the inflatable device comprising:
    one or more temporarily mounted inflatable wedges mounted to a chute wall with one or more bladder openings for receiving an inflatant;
    a source of inflatant, and
    a control box mounted to the chute wall, having a pipeline running from each wedge to the control box, each pipeline serving as a communication passage for delivery of inflatant to allow individual wedge inflation and deflation, the control box further having an intake and outlet valve for receiving inflatant from an inflatant source and releasing same.

12. The inflatable device of claim 11 wherein one or more communicating passages comprises a hose with a first end that couples with the control valve and a second end connected to an air compressor.

* * * * *